US009696823B2

(12) United States Patent
Huang et al.

(10) Patent No.: US 9,696,823 B2
(45) Date of Patent: Jul. 4, 2017

(54) COMPUTER AND METHOD FOR SHARING INPUT DEVICE THEREOF

(75) Inventors: Maolin Huang, Beijing (CN); Xiaojian Ding, Beijing (CN); Yuru Jin, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 847 days.

(21) Appl. No.: 12/583,061

(22) Filed: Aug. 13, 2009

(65) Prior Publication Data

US 2010/0049897 A1 Feb. 25, 2010

(30) Foreign Application Priority Data

Aug. 25, 2008 (CN) .......................... 2008 1 0118474

(51) Int. Cl.
*G06F 13/00* (2006.01)
*G06F 3/038* (2013.01)
*G06F 3/02* (2006.01)

(52) U.S. Cl.
CPC ............ *G06F 3/038* (2013.01); *G06F 3/0227* (2013.01)

(58) Field of Classification Search
CPC .... G06F 13/4022; G06F 3/0635; G06F 13/36; G06F 13/38; G06F 13/385; H04L 12/04; H04L 12/50; H04L 49/101; H04J 2203/0016; H04Q 2213/04
USPC ..... 710/36, 38, 51, 104, 105, 306, 313, 315, 710/316, 317
See application file for complete search history.

(56) References Cited

U.S. PATENT DOCUMENTS

| | | | |
|---|---|---|---|
| 5,623,261 A * | 4/1997 | Rose | 341/26 |
| 6,243,772 B1 * | 6/2001 | Ghori et al. | 710/68 |
| 6,489,932 B1 * | 12/2002 | Chitturi et al. | 345/30 |
| 6,636,912 B2 * | 10/2003 | Ajanovic et al. | 710/105 |
| 6,802,010 B1 * | 10/2004 | Kim et al. | 726/20 |
| 7,089,339 B2 * | 8/2006 | Falik et al. | 710/200 |

(Continued)

FOREIGN PATENT DOCUMENTS

| | | |
|---|---|---|
| CN | 1643508 A | 7/2005 |
| CN | 1694086 A | 11/2005 |

*Primary Examiner* — Tim T Vo
*Assistant Examiner* — Kim T. Huynh
(74) *Attorney, Agent, or Firm* — Kinney & Lange, P.A.

(57) ABSTRACT

According to the present invention, a computer is provided, which comprises a host system, an embedded subsystem, a power source, an input device control module, a first transmission interface and a second transmission interface, the input device control module being connected to the embedded subsystem through the first transmission interface, wherein the input device control module is configured to establish, in response to receipt of a first switching instruction, communication with the embedded subsystem such that the embedded subsystem is enabled to process input data from an input device and to transmit the input data obtained from the input device to the first transmission interface; and the embedded subsystem is configured to receive the input data from the first transmission interface, process the input data and perform an operation corresponding to the input data. According to the present invention, one set of input devices can be shared between a computer and an embedded system through design and modification in software without any change in the existing hardware design for the computer.

10 Claims, 2 Drawing Sheets

(56) References Cited

U.S. PATENT DOCUMENTS

| | | | |
|---|---|---|---|
| 7,124,222 B2* | 10/2006 | Bar-Or | 710/106 |
| 7,266,774 B2* | 9/2007 | Jones | 715/733 |
| 7,725,749 B2* | 5/2010 | Mitarai | 713/323 |
| 7,925,900 B2* | 4/2011 | Parks et al. | 713/300 |
| 2002/0173344 A1* | 11/2002 | Cupps et al. | 455/566 |
| 2003/0041206 A1* | 2/2003 | Dickie | 710/303 |
| 2004/0039950 A1* | 2/2004 | Okamoto et al. | 713/300 |
| 2005/0005176 A1 | 1/2005 | Park | |
| 2007/0168574 A1 | 7/2007 | Martinez et al. | |
| 2007/0198760 A1* | 8/2007 | Han | 710/303 |
| 2008/0244289 A1* | 10/2008 | LeProwse et al. | 713/320 |

\* cited by examiner

COMPUTER AND METHOD FOR SHARING INPUT DEVICE THEREOF

BACKGROUND OF THE INVENTION

Field of Invention

The present invention generally relates to the computer technology, and in particular, to a computer and a method for sharing an input device thereof.

Description of Prior Art

In general, an embedded system means a non-PC system which is a device or an equipment having functions of a computer while not being referred to as a computer. It is an application-centered dedicated system whose software and/or hardware can be tailored to adapt to strict overall requirements of application systems on functionality, reliability, cost, volume, and power consumption. In other words, in a manner similar to the operation of BIOS in a PC, an embedded system integrates its application software with hardware to achieve features, such as small size of software codes, high automation level and fast response, and thus is particularly suitable for architectures with real-time and multi-task demands. An embedded system is a stand-alone "device" composed mainly of an embedded processor, associated supporting hardware, an embedded operating system, and application software systems.

Embedded systems are involved in almost all electrical devices in our daily life, such as handheld personal digital assistants (PDAs), mobile computing devices, TV set-top boxes, internetworking mobile phones, digital TVs, multimedia devices, vehicles, microwave ovens, digital cameras, home automation systems, elevators, air conditioners, safety systems, vending machines, cellular phones, consumer electronics, industrial automation instruments, medical equipments, and the like.

The hardware portion of an embedded system comprises a processor/micro processor, a memory and peripherals, as well as I/O ports and a graphical controller and the like. An embedded system differs from a common computer processing system in that it does not have a mass storage medium like a hard drive, and generally uses an EPROM or a flash memory as the storage medium instead. Its software portion comprises embedded operating system software (which requires real-time and multi-task operations) and application programming. The application programming controls the operation and behavior of the system, while the embedded operating system controls the interaction between the application programming and the hardware.

In some applications, it is desired to combine an embedded system and a notebook computer together. In this case, the software and/or hardware of the embedded system remain independent of the notebook computer due to the stand-alone characteristic of the embedded system itself. However, for an embedded system which requires input/output devices for its own, its separate devices such as keyboard and mouse may have a serious impact on the size, weight and appearance when being combined with the notebook computer. Therefore, user experience will be greatly deteriorated if the original input devices of the notebook computer cannot be shared by the embedded subsystem.

SUMMARY OF THE INVENTION

It is an object of embodiments of the present invention to provide a computer and a method for sharing an input device thereof, by which it is possible to address the above-identified problem that an embedded subsystem is not able to share an input device with a computer.

In order to achieve the above object, according to an aspect of the invention, a computer is provided, which comprises a host system, an embedded subsystem, a power source, an input device control module, a first transmission interface and a second transmission interface, the power source being connected to the embedded subsystem, the host system and the input device control module, respectively, the input device control module being connected to the embedded subsystem through the first transmission interface and to the host system through the second transmission interface, wherein the input device control module is configured to establish, in response to receipt of a first switching instruction, communication with the embedded subsystem such that the embedded subsystem is enabled to process input data from an input device connected to the input device control module and to transmit the input data obtained from the input device to the first transmission interface; and the embedded subsystem is configured to receive the input data from the first transmission interface, process the input data and perform an operation corresponding to the input data.

Preferably, in the computer described above, the input device control module is configured to transmit, in response to receipt of a second switching instruction, the input data obtained from the input device to the second transmission interface such that the host system is enabled to process the input data.

Preferably, in the computer described above, the input device control module is an embedded controller (EC) and the embedded subsystem comprises an input device processing module and a virtual input device driving module, wherein the input device processing module is configured to receive the input data from the first transmission interface and to parse the type of the input data from the input data for generating data type information; and the virtual input device driving module is configured to convert the input data into data executable by the embedded subsystem based on the data type information.

Preferably, in the computer described above, the first transmission interface is a system management bus interface.

Preferably, in the computer described above, the embedded subsystem comprises a personal digital assistant or a mobile phone; and the input device comprises a keyboard, a mouse, a touchpad or a writing tablet which is connected to the computer.

Further, a method for sharing an input device of a computer comprising a host system, an embedded subsystem, a power source, an input device control module, a first transmission interface and a second transmission interface, the power source being connected to the embedded subsystem, the host system and the input device control module, respectively, the input device control module being connected to the embedded subsystem through the first transmission interface and to the host system through the second transmission interface, the method comprising:

transmitting, by the input device control module, input data inputted from an input device connected to the input device control module to the first transmission interface in response to receipt of a first switching instruction and completion of establishing communication with the embedded subsystem based on the first switching instruction; and receiving, by the embedded subsystem, the input data from the first transmission interface to process the input data and perform an operation corresponding to the input data.

Preferably, in the method described above, the step of receiving, by the embedded subsystem, the input data from the first transmission interface to process the input data and perform an operation corresponding to the input data comprises:

receiving, by an input device processing module of the embedded subsystem, the input data from the first transmission interface to parse the type of the input data from the input data for generating data type information; and converting, by a virtual input device driving module of the embedded subsystem, the input data into data executable by the embedded subsystem based on the data type information.

Preferably, the method further comprises:

transmitting, by the input device control module, the input data to the second transmission interface in response to receipt of a second switching instruction.

Preferably, in the method described above, establishing communication with the embedded subsystem based on the first switching instruction comprises:

outputting, by the input device control module, a first request signal to the embedded subsystem;

enabling, by the embedded subsystem based on the first request signal, a module for processing the input data; and returning, by the embedded subsystem, a first switching completion signal to the input device control module once the module for processing the input data is enabled.

According to the present invention, at least the following effects can be achieved.

1. It is possible to take full advantage of the functionality of EC in a notebook computer to share one set of input devices between the notebook computer and an embedded system through design and modification in software without any change in the existing hardware design for the input devices of the notebook computer.

2. It is possible for an embedded sybsystem to share existing input devices of a notebook computer, such as keyboard and mouse. As a result, it is possible to reduce the size and weight of the notebook computer in which the embedded subsystem is integrated such that user experience can be significantly improved.

DETAILED DESCRIPTION OF PREFERRED EMBODIMENTS

The above objects, advantages and features of the present invention will be apparent from the following detailed description on preferred embodiments thereof taken in conjunction with the drawings.

A built-in keyboard (e.g. a matrix keyboard) and a built-in mouse (e.g. a touchpad or trackpoint) are necessary for a notebook computer to be portable. Therefore, a dedicated keyboard controller is desired. An Embedded Controller (EC) specific to notebook computers is designed for this function.

An EC is a 16-bit single-chip machine which is a unique part of a notebook computer. The usage of the EC is an essential point by which a notebook computer differs from a common desktop computer. In fact, as an extension of a conventional Keyboard Controller (KBC), the EC for a notebook computer has two parts of functions, KBC and embedded control. Currently, ECs are popularly used in designs for notebook computers having an intelligent power saving function in order to fulfill tasks such as intelligent charging/discharging management for the built-in keyboard, touchpad and battery of the notebook computer as well as temperature monitoring.

According to the present invention, sharing of an input device of a notebook computer between an embedded subsystem and a host system is achieved with the functionality of the EC.

Figure 1:
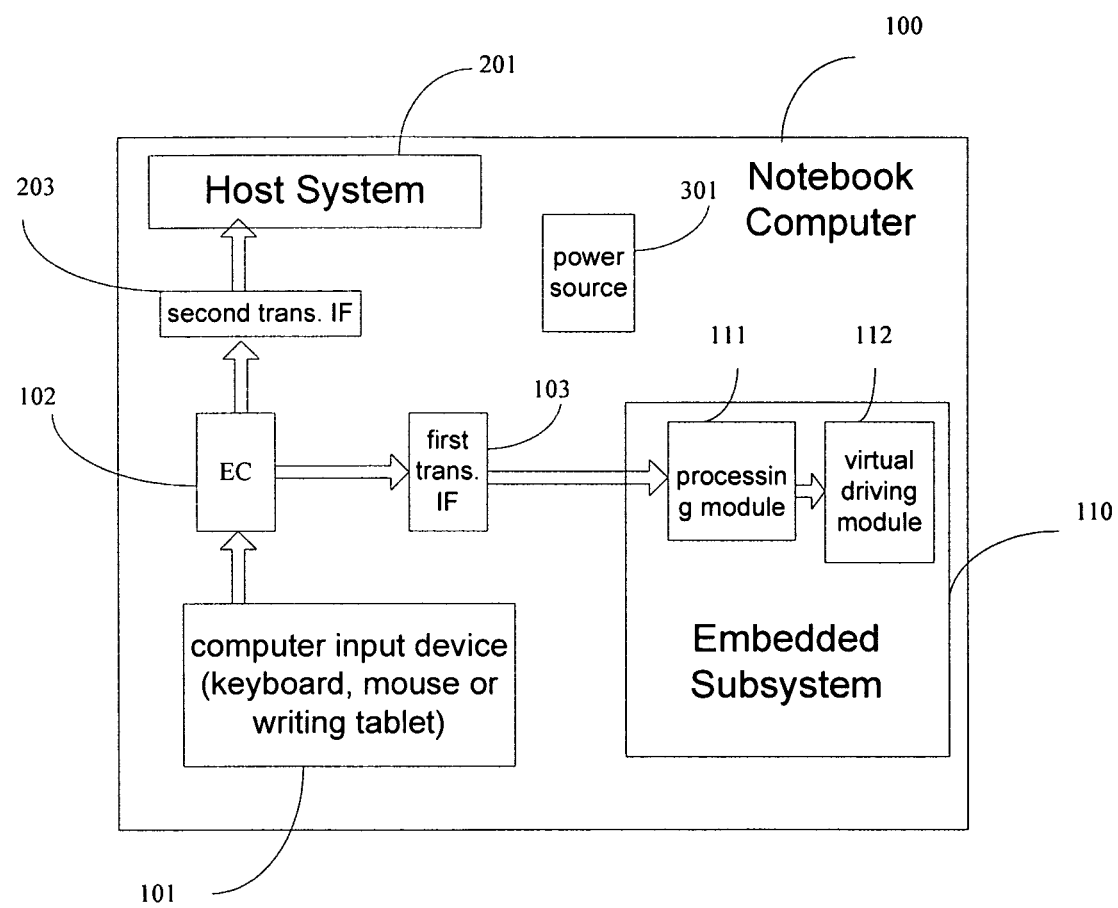
FIG. 1 is a structural block diagram showing a notebook computer according to an embodiment of the present invention.

FIG. 1 is a structural block diagram showing a notebook computer according to an embodiment of the present invention. As shown, a notebook computer 100 comprises a computer input device 101 (which may be a keyboard, a mouse, a touchpad, a writing tablet or the like), an embedded controller 102 and a power source 301, as well as an embedded subsystem 110 and a host system 201. The power source 301 is connected to the embedded controller 102, the embedded subsystem 110 and the host system 201, respectively. The input device 101 is connected to the embedded controller 102 which is connected to the embedded subsystem 110 through a first transmission interface 103 and to the host system 201 through a second transmission interface 203.

The embedded controller 102 is configured to establish, in response to receipt of a first switching instruction, communication with the embedded subsystem 110, i.e., to communicatively handshake with the embedded subsystem 110, such that the embedded subsystem 110 is enabled to process input data from the input device 101 and to transmit the input data to the first transmission interface.

The embedded subsystem 110 is configured to receive the input data from the first transmission interface 103, process the input data and perform an operation corresponding to the input data.

The embedded subsystem 110 comprises an input device processing module 111 and a virtual input device driving module 112. The input device processing module 111 is configured to receive the input data from the first transmission interface 103 and to parse the type of the input data from the input data for generating data type information. The virtual input device driving module 112 is configured to convert the input data into data executable by the embedded subsystem based on the data type information.

The transmission interface may be a system management bus (SMBus) interface or another interface capable of implementing such function, for example, a USB interface.

Further, the embedded controller (EC) 102 is configured to transmit, in response to receipt of a second switching instruction, the input data obtained from the input device 101 to the second transmission interface 203 directly, such that the host system 201 is enabled to process the input data.

As an example, the switching instructions explained above may be triggered by software or hardware. For example, the first switching instruction may be triggered under a condition that the host system 201 is disabled while the embedded subsystem 110 is enabled, or that an actuation of a key, which is newly set on the notebook computer or is a reused key of the notebook computer keyboard, is detected. The second switching instruction may be triggered under a condition that the embedded subsystem 110 is disabled while the host system 201 is enabled. Additionally, the second switching instruction may be generated by means of hardware in the same way as the generation of the first switching instruction, the description of which is thus omitted herein.

The embedded subsystem 110 may be a personal digital assistant or a mobile phone having a WinCE operating system built-in.

According to an embodiment of the present invention, a method for sharing an input device of a computer is also provided, which is applied to a computer comprising a host system, an embedded subsystem, a power source, an input device control module, a first transmission interface and a second transmission interface, the power source being connected to the embedded subsystem, the host system and the input device control module, respectively, the input device control module being connected to the embedded subsystem through the first transmission interface and to the host system through the second transmission interface.

Figure 2:
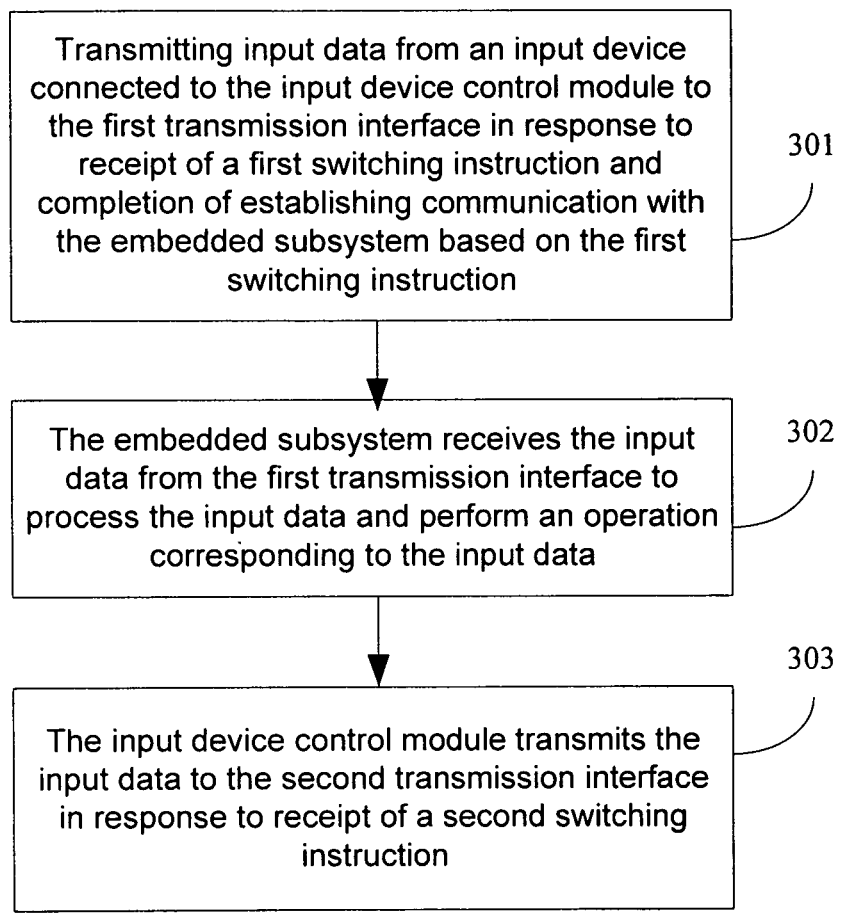
FIG. 2 is a flow chart illustrating steps of a method for sharing an input device of a notebook computer according to an embodiment of the present invention.

FIG. 2 is a flow chart illustrating steps of the method for sharing an input device of a computer according to an embodiment of the present invention. As shown, the method comprises following steps.

At step 301, the input device control module transmits input data inputted from the input device connected to the input device control module to the first transmission interface in response to receipt of a first switching instruction and completion of establishing communication with the embedded subsystem based on the first switching instruction.

At step 302, the embedded subsystem receives the input data from the first transmission interface to process the input data and perform an operation corresponding to the input data.

The method may further comprise a step 303 in which the input device control module transmits the input data to the second transmission interface in response to receipt of a second switching instruction.

Preferably, step 302 comprises: receiving, by an input device processing module of the embedded subsystem, the input data from the first transmission interface to parse the type of the input data from the input data for generating data type information; and converting, by a virtual input device driving module of the embedded subsystem, the input data into data executable by the embedded subsystem based on the data type information.

Preferably, at step 301, establishing communication with the embedded subsystem based on the first switching instruction comprises:

outputting, by the input device control module, a first request signal to the embedded subsystem;
enabling, by the embedded subsystem based on the first request signal, a module for processing the input data; and
returning, by the embedded subsystem, a first switching completion signal to the input device control module once the module for processing the input data is enabled.

The first request signal may comprise some parameters for the input data such as the type and packet length of the input data, the number of related data packets and the like.

Furthermore, the embedded subsystem may further determine whether it has certain demands currently on the input data based on the first request signal. If so, the module for processing the input data is enabled and the embedded subsystem returns the first switching completion signal to the input device control module once the module for processing the input data is enabled. Otherwise no action is taken. The embedded subsystem returns a first switching failure signal to the input device control module if the module for processing the input data is disabled.

It can be seen from the description above that, according to embodiments of the present invention, one set of input devices including for example a keyboard and a touchpad can be shared between an embedded system and a host system of a notebook computer through design and modification in software without any change in the existing hardware design for the input devices of the notebook computer.

The foregoing embodiments are further described in detail, taking a keyboard as an example. For an existing notebook computer, a keyboard input is responded by an EC. When the condition for triggering the first switching instruction is satisfied as described above, the EC transfers the input data from the keyboard to the embedded subsystem via a SMBus interface (other interfaces may alternatively be used). The application, i.e., the input device processing module, of the embedded subsystem transfers the keyboard input (a scan code) from the SMBus driver to the virtual keyboard driver which converts the keyboard input into data executable by the embedded subsystem such that the input by the user can be responded by the embedded subsystem.

In addition, the present invention may also be applied to a common computer. In a desktop computer, a keyboard and a mouse are independent of the host system and connected thereto by a common standardized PS/2 or USB port. Therefore, in a common desktop computer, it is necessary to design an input device control module for collectively managing input devices connected to the host of the desktop computer. The computer comprises a host system, an embedded subsystem, a power source, an input device control module, a first transmission interface and a second transmission interface, the power source being connected to the embedded subsystem, the host system and the input device control module, respectively, the input device control module being connected to the embedded subsystem through the first transmission interface and to the host system through the second transmission interface.

The input device control module is configured to establish, in response to receipt of a first switching instruction, communication with the embedded subsystem such that the embedded subsystem is enabled to recognize input data from an input device connected to the input device control module and to transmit the input data obtained from the input device to the first transmission interface.

The embedded subsystem is configured to receive the input data from the first transmission interface, process the input data and perform an operation corresponding to the input data.

The input device control module is further configured to use, in response to receipt of a second switching instruction, the input device as an input device of the host system, and transmit the input data obtained from the input device to the second transmission interface such that the host system is enabled to process the input data.

By means of the embodiments according to the present invention, the following advantages can be achieved.

1. It is possible to take full advantage of the functionality of EC in a notebook computer without any change in the existing design for input devices of the notebook computer.
2. It is possible for an embedded subsystem to share existing input devices of a notebook computer, such as keyboard and mouse. As a result, it is possible to reduce the size and weight of the notebook computer in which the embedded subsystem is integrated such that user experience can be significantly improved.

It should be noted that the foregoing embodiments are illustrative only and should not be considered as limiting the present invention. It will be understood by those skilled in the art that various changes and alternatives may be made without departing from the spirit and scope of the present invention defined by the appended claims.

What is claimed is:

1. A system, comprising a PC system and an embedded subsystem, the PC system comprising a host system, a power source, an Embedded Controller (EC) specific to the PC system, a first transmission interface, a second transmission interface and an input device, the power source being connected to the embedded subsystem, the host system and the EC, respectively, and the EC being connected to the embedded subsystem through the first transmission interface and to the host system through the second transmission interface, wherein the EC is configured to establish, in response to receipt of a first switching instruction, communication with the embedded subsystem such that the embedded subsystem is enabled to process input data from the input device connected to the EC and to transmit the input data obtained from the input device to the first transmission interface, and is further configured to transmit, in response to receipt of a second switching instruction, the input data obtained from the input device to the second transmission interface such that the host system is enabled to process the input data, wherein the first switching instruction is triggered by detecting that the host system is disabled while the embedded subsystem is enabled, and the second switching instruction is triggered by detecting that the host system is enabled while the embedded subsystem is disabled; and the embedded subsystem is configured to receive the input data from the first transmission interface, process the input data and perform an operation corresponding to the input data;

wherein sharing of the input device between the embedded subsystem and the host system is achieved by the EC, wherein, the embedded subsystem is separable from the system, such that the embedded subsystem and the PC system, upon separation, are capable operating independently of each other, wherein the embedded subsystem comprises a personal digital assistant or a mobile phone, and wherein the embedded subsystem further comprises an input device processing module and a virtual input device driving module, wherein:

the input device processing module is configured to receive the input data from the first transmission interface and to parse the type of the input data from the input data for generating data type information; and the virtual input device driving module is configured to convert the input data into data executable by the embedded subsystem based on the data type information.

2. The system according to claim 1, wherein the first transmission interface is a system management bus interface.

3. The system according to claim 1, wherein the input device comprises a keyboard, a mouse, a touchpad or a writing tablet.

4. A method for sharing an input device of a system comprising a PC system and an embedded subsystem, the PC system comprising a host system, a power source, an Embedded Controller (EC) specific to the PC system, a first transmission interface and a second transmission interface, the power source being connected to the embedded subsystem, the host system and the EC, respectively, and the input device control module being connected to the embedded subsystem through the first transmission interface and to the host system through the second transmission interface, the method comprising:

transmitting, by the EC, input data inputted from the input device connected to the EC to the first transmission interface in response to receipt of a first switching instruction and establishment of communication with the embedded subsystem based on the first switching instruction;

receiving, by the embedded subsystem, the input data from the first transmission interface to process the input data and perform an operation corresponding to the input data; and transmitting, by the EC, the input data to the second transmission interface in response to receipt of a second switching instruction;

wherein the first switching instruction is triggered by detecting that the host system is disabled while the embedded subsystem is enabled, and the second switching instruction is triggered by detecting that the host system is enabled while the embedded subsystem is disabled, wherein the embedded subsystem is separable from the system, such that the embedded subsystem and the PC system, upon separation, are capable of operating independently each other;

wherein the embedded subsystem comprises a personal digital assistant or a mobile phone, and wherein the step of receiving, by the embedded subsystem, the input data from the first transmission interface to process the input data and perform an operation corresponding to the input data comprises:

receiving, by an input device processing module of the embedded subsystem, the input data from the first transmission interface to parse the type of the input data from the input data for generating data type information; and converting, by a virtual input device driving module of the embedded subsystem, the input data into data executable by the embedded subsystem based on the data type information.

5. The method according to claim 4, wherein establishing communication with the embedded subsystem based on the first switching instruction comprises:

outputting, by the EC, a first request signal to the embedded subsystem;

enabling, by the embedded subsystem based on the first request signal, a module for processing the input data; and returning, by the embedded subsystem, a first switching completion signal to the EC once the module for processing the input data is enabled.

6. The system according to claim 1, wherein
the first switching instruction is triggered by software or hardware under a condition that the host system is disabled while the embedded subsystem is enabled, or by an actuation of a key provided on the system; and
the second switching instruction is triggered by software or hardware under a condition that the embedded subsystem is disabled while the host system is enabled, or by an actuation of a key provided on the system.

7. The system according to claim 1, wherein
the EC is configured to output, in response to the first switching instruction, a first request signal to the embedded subsystem;
the embedded subsystem is configured to enable, in response to the first request signal, a module for processing the input data, and return a first switching completion signal to the EC if the module for processing the input data is enabled.

8. The method according to claim 4, wherein
the first switching instruction is triggered by software or hardware under a condition that the host system is disabled while the embedded subsystem is enabled, or by an actuation of a key provided on the system; and
the second switching instruction is triggered by software or hardware under a condition that the embedded subsystem is disabled while the host system is enabled, or by an actuation of a key provided on the system.

9. The method according to claim 4, wherein establishment of communication with the embedded subsystem comprises:
outputting, by the EC in response to the first switching instruction, a first request signal to the embedded subsystem;
enabling, by the embedded subsystem in response to the first request signal, a module for processing the input data, and
returning, by the embedded subsystem, a first switching completion signal to the EC if the module for processing the input data is enabled.

10. The system according to claim 7, wherein
the embedded subsystem is configured to enable, in response to the first request signal, the module for processing the input data only if the embedded subsystem requires the input data.

* * * * *